(12) United States Patent  
Anderson

(10) Patent No.: US 7,040,255 B1
(45) Date of Patent: May 9, 2006

(54) PET RESTRAINT

(76) Inventor: Michael D. Anderson, 513 Birch La., Hudson, WI (US) 54016

( * ) Notice: Subject to any disclaimer, the term of this patent is extended or adjusted under 35 U.S.C. 154(b) by 186 days.

(21) Appl. No.: 10/901,386

(22) Filed: Jul. 27, 2004

(51) Int. Cl.
*A01K 27/00* (2006.01)

(52) U.S. Cl. .................. 119/791; 119/784; 119/785

(58) Field of Classification Search .......... 119/791, 119/784, 785, 700, 701, 702, 712; 16/87
See application file for complete search history.

(56) References Cited

U.S. PATENT DOCUMENTS

| | | | |
|---|---|---|---|
| 274,462 A * | 3/1883 | Christopher et al. ........ 119/785 |
| 1,087,062 A | 2/1914 | Izett |
| 1,222,007 A | 4/1917 | McGuire |
| 1,563,212 A * | 11/1925 | Madiar ...................... 119/784 |
| 2,725,973 A * | 12/1955 | King ......................... 198/683 |
| 3,648,664 A | 3/1972 | Nunley |
| 3,678,903 A * | 7/1972 | Ferraro ...................... 119/784 |
| 3,965,866 A * | 6/1976 | Lorentz et al. ............. 119/704 |
| 4,138,966 A * | 2/1979 | Hesnault .................... 119/701 |
| 4,223,638 A * | 9/1980 | Sappington et al. ........ 119/57.6 |
| 4,232,630 A * | 11/1980 | Orlowski et al. ........... 119/703 |
| 4,387,812 A | 6/1983 | Biller et al. |
| 4,398,640 A | 8/1983 | Hunter |
| 4,667,625 A * | 5/1987 | Malone ...................... 119/785 |
| 5,127,338 A | 7/1992 | Flux |
| 5,213,063 A * | 5/1993 | Franck, III ................. 119/797 |
| 5,339,773 A * | 8/1994 | Van Druff ................... 119/785 |
| 5,437,246 A * | 8/1995 | Noles ......................... 119/785 |
| 5,701,824 A | 12/1997 | Johnson et al. |
| 6,412,420 B1 | 7/2002 | Kramer et al. |

FOREIGN PATENT DOCUMENTS

GB 2060344 A * 5/1981

\* cited by examiner

*Primary Examiner*—Yvonne R. Abbott
(74) *Attorney, Agent, or Firm*—Merchant & Gould PC

(57) ABSTRACT

A pet restraint system includes anchors at either end with a cable extending between the anchors. Intermediate cable supports are positioned between the anchors. A trolley with a pet leash attachment slides along the cable with three wheels engaging the cable. One of the wheels is movable and moves to a second position to permit the trolley to travel across the intermediate cable supports.

12 Claims, 10 Drawing Sheets

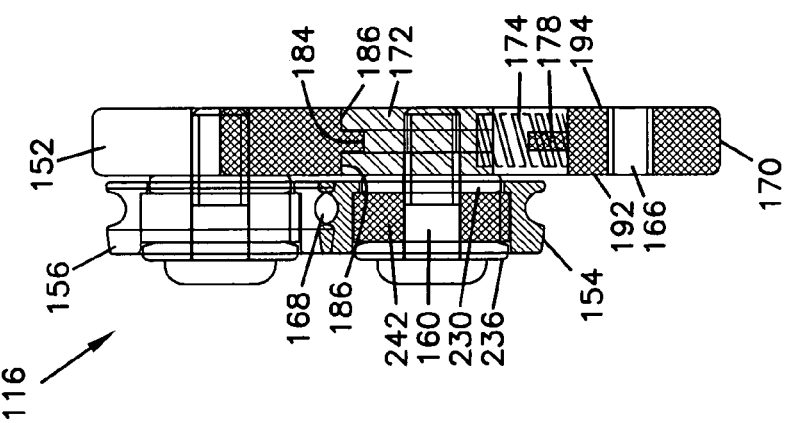
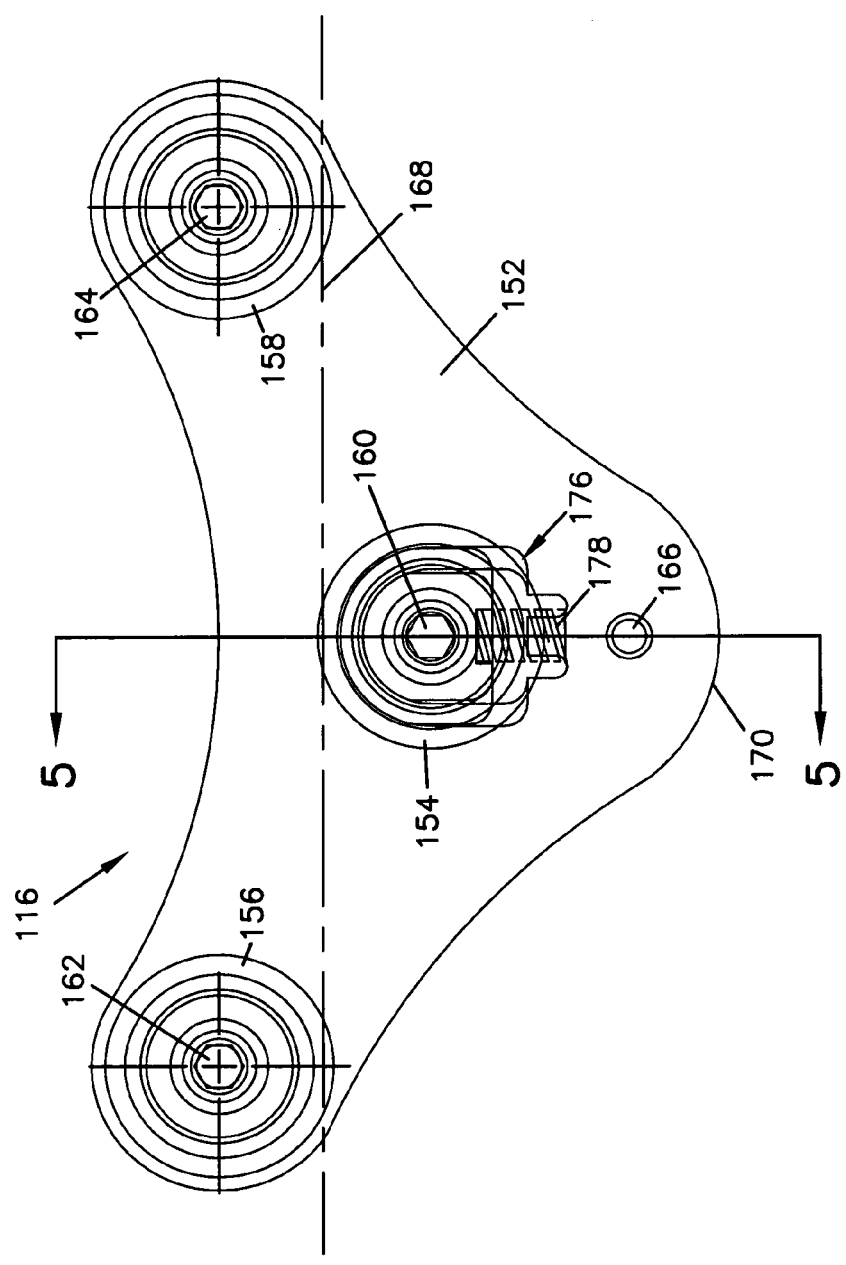

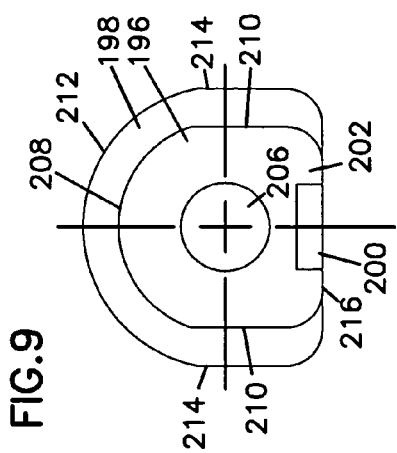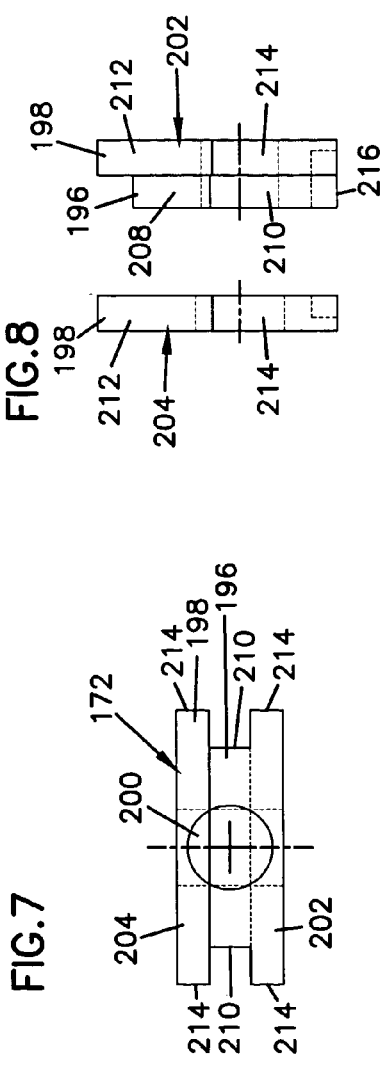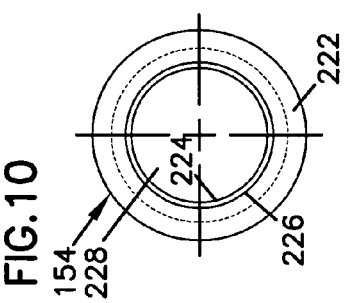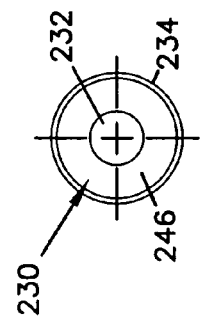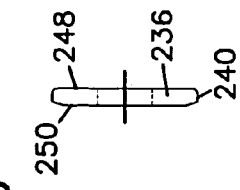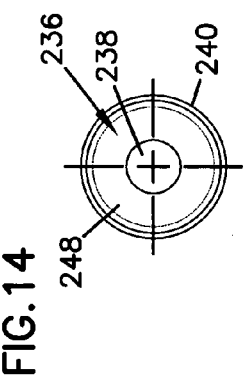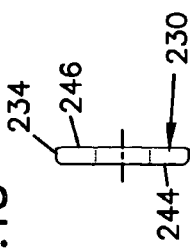

PET RESTRAINT

FIELD

The present invention relates generally to a pet restraining system attached to a leash. More specifically, the present invention relates to a cable system allowing pets to roam in an extended area.

BACKGROUND

It is common to provide an extended leash tethered to a fixed point to restraint a pet such as a dog within a particular area while preventing the animal from escaping. Such leashes also help prevent pets from entering areas where they might be in danger of harm or where the animal's presence is unwanted. However, such tethered leashes essentially restrict the animal to a particular radius of movement and are not particularly amenable to irregularly or linearly extended areas.

It is also known to provide a cable along which a tethered leash may travel, permitting pets to be restrained within areas which are not particularly circular in shape. It is desirable that the cables to which the leash may travel be supported above the ground, so that extended cable runs may require intermediate supports. Movement of the leash attachment to the cable across such intermediate supports without abruptly halting the pet's progress is desirable.

SUMMARY OF THE INVENTION

The present invention relates to a pet restraint system including a cable extending between a first anchor and a second anchor, the cable suspended above the ground between the anchors. At least one intermediate support supports the cable above the ground and is positioned between the anchors. A wheeled trolley is mounted to the cable and is slidable along the length of the cable. The trolley includes three wheels contacting the cable. A movable wheel on one side and two wheels opposite the movable wheel. The trolley maintains contact with the cable as the trolley passes across the intermediate support. A pet leash is attached at a first end to the trolley. A second end of the leash is adapted for being releasably connected to a pet harness. The at least one intermediate support includes a portion mounted about the cable. The movable wheel of the trolley is slidably mounted to the trolley and slides in a direction generally perpendicular to the cable. The movable wheel is spring biased toward the opposing wheels. The movable wheel is slidable from a first position toward the opposing wheels, where the three wheels cooperate to hold the trolley to the cable, to a second position away from the opposing wheels which permits the trolley to pass across the intermediate support.

The present invention further relates to a trolley for a pet restraint system. The pet restraint system includes a cable extending between first and second anchors and an intermediate support positioned between the two anchors supporting the cable. The trolley includes a frame, a first wheel and a second wheel rotatably mounted to the frame by fixed axles, and a third wheel positioned intermediate the first and second wheels and rotatably mounted to the frame by a movable axle. Each of the wheels includes a circumferential outer groove sized to receive the cable. The wheels are positioned to define a cable path with the first and second wheels on a first side of the cable path and the third wheel on an opposite side of the cable path. The movable axle is movable in a direction generally perpendicular to the cable path between a first position and a second position. With the movable axle in the first position, the cable path is sized to retain the cable within the grooves of the wheels. With the movable axle in the second position, the cable path is sized to permit the intermediate support to pass through the cable path without removing the cable from the cable path. The movable axle is biased to the first position. The trolley also includes an attachment point for attaching a pet leash.

BRIEF DESCRIPTION OF THE DRAWINGS

The accompanying drawings, which are incorporated in and constitute a part of the description, illustrate several aspects of the invention and together with the detailed description, serve to explain the principles of the invention. A brief description of the drawings is as follows:

FIG. 4 is a front view of a trolley for use with the system of FIG. 1.

FIG. 5 is a side cross-sectional view of the trolley of FIG. 4, taken along the line marked 5—5.

FIG. 7 is a bottom view of a movable hub for use with the frame of FIG. 6.

FIG. 8 is a side exploded view of the movable hub of FIG. 7.

FIG. 9 is a front view of a portion of the movable hub of FIG. 7.

FIG. 10 is a front view of a wheel for use with the trolley of FIG. 7.

FIG. 11 is a cross-sectional view of the wheel of FIG. 10.

FIG. 12 is a front view of an inner retainer for use with the wheel of FIG. 10, to hold the wheel to an axle.

FIG. 13 is a side view of the inner retainer of FIG. 12.

FIG. 14 is a front view of an outer retainer for use with the wheel of FIG. 10, to hold the wheel to an axle.

FIG. 15 is a side view of the outer retainer of FIG. 14.

DETAILED DESCRIPTION

Reference will now be made in detail to exemplary aspects of the present invention which are illustrated in the accompanying drawings. Wherever possible, the same reference numbers will be used throughout the drawings to refer to the same or like parts.

Figure 1:
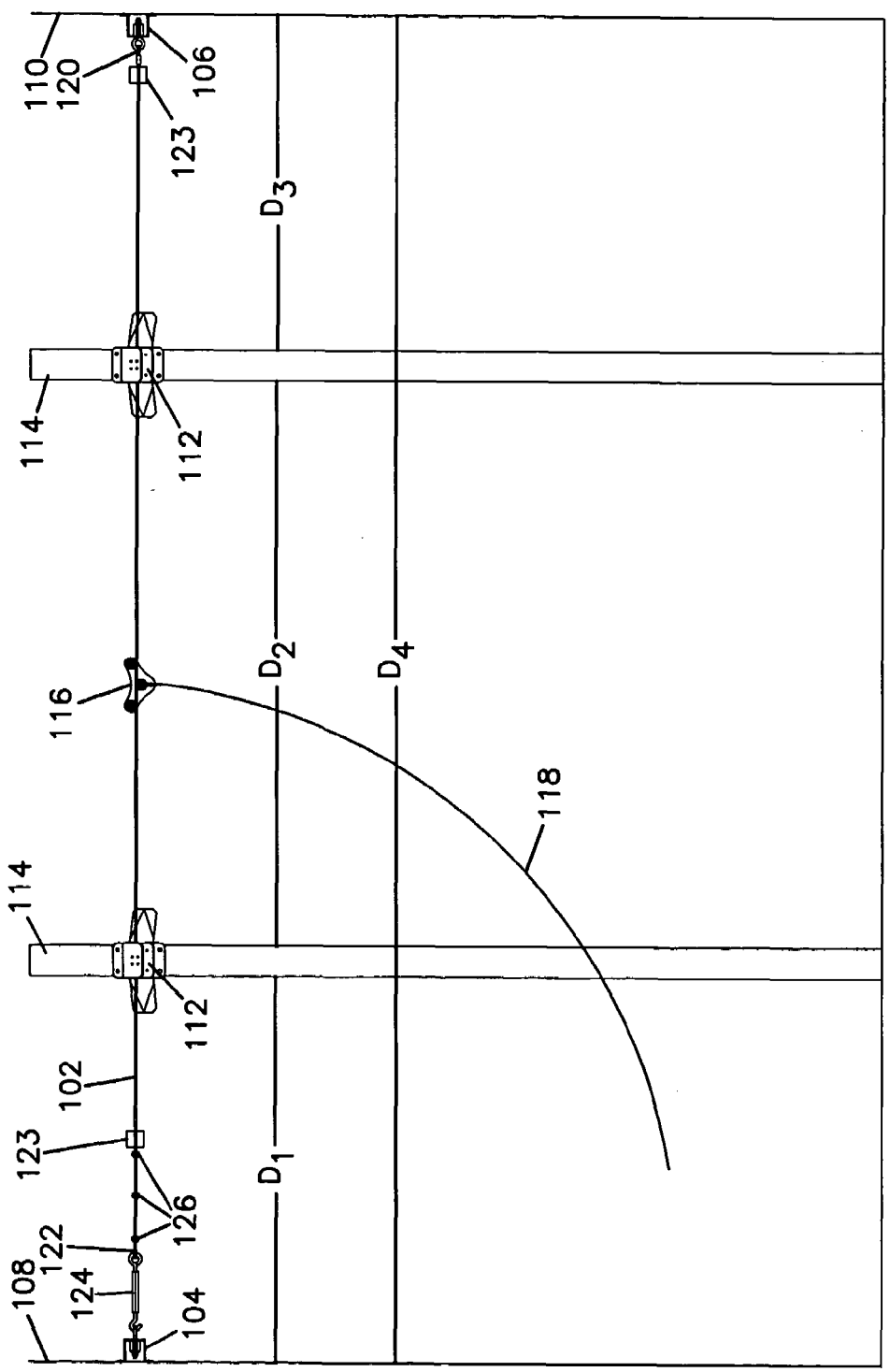
FIG. 1 is a schematic view of a pet restraining system according to the present invention.

FIG. 1 shows a pet restraint system 100 with a cable 102 extending between a first anchor 104 and a second anchor 106. Anchor 104 is mounted to a first end support 108 and anchor 106 is mounted to a second end support 110. Positioned along cable 102 between anchors 104 and 106 are a pair of intermediate supports 112, each mounted to an intermediate support, such as a post 114. A wheeled trolley 116 is mounted to cable 102 and is movable across intermediate supports 112 between anchors 104 and 106. A pet leash 118 extends down from trolley 116 for attaching to a pet collar or harness.

Cable 102 extends between anchors 104 and 106 a distance D4. It is desirable that cable 102 be supported above the ground and distance D4 may be long enough that excessive tension in cable 102 would be required to prevent cable 102 from sagging to the ground. End supports 108 and 110 may not be sturdy to resist the high tension required. Intermediate supports 112 are positioned at a distance D1 from first anchor 104 and a distance D3 from second anchor 106, and separated by a distance D2. It is anticipated that each distance D1, D2 and D3 may be up to or greater than fifty feet.

Cable 102 may include a fixed end 120 with a more permanently assembled eye and an adjustable end 122 which may be sized as needed to fit appropriately between anchors 104 and 106. A turnbuckle 124 may be included between adjustable end 122 and anchor 104 to permit fine tuning of the length of cable 102 to fit ditance D4 between end supports 108 and 110. Turnbuckle 124 also permits adjustments to address creep or stretch of cable 102 over time. One or more cable clamps 126 may be used to form a loop in adjustable end 122. A pair of trolley stops 123 are mounted about cable 102, one each adjacent to anchors 104 and 106, to prevent trolley 116 from advancing any closer to anchor 104 or anchor 106.

Figure 3:
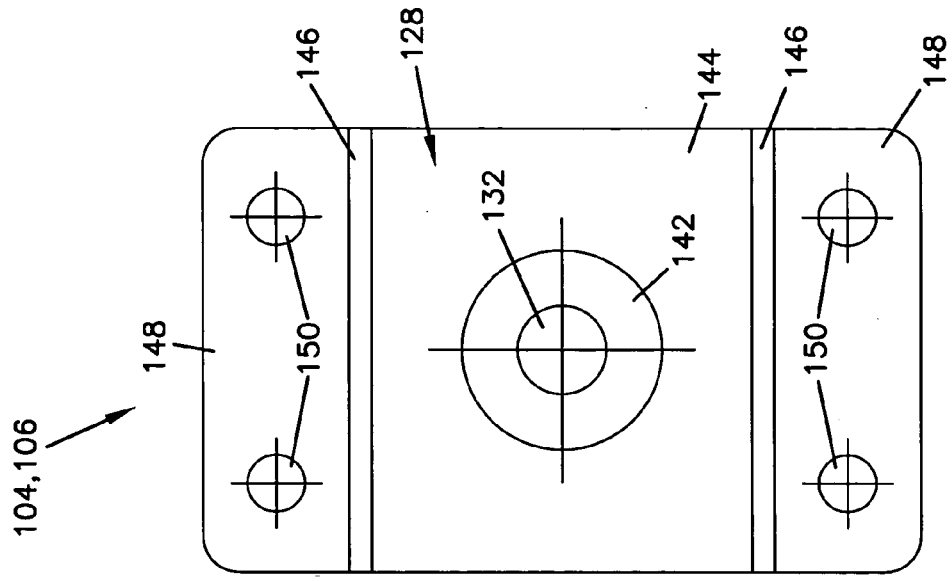
FIG. 3 is a rear view of the anchor of FIG. 2, with the eyebolt removed.
Figure 2:
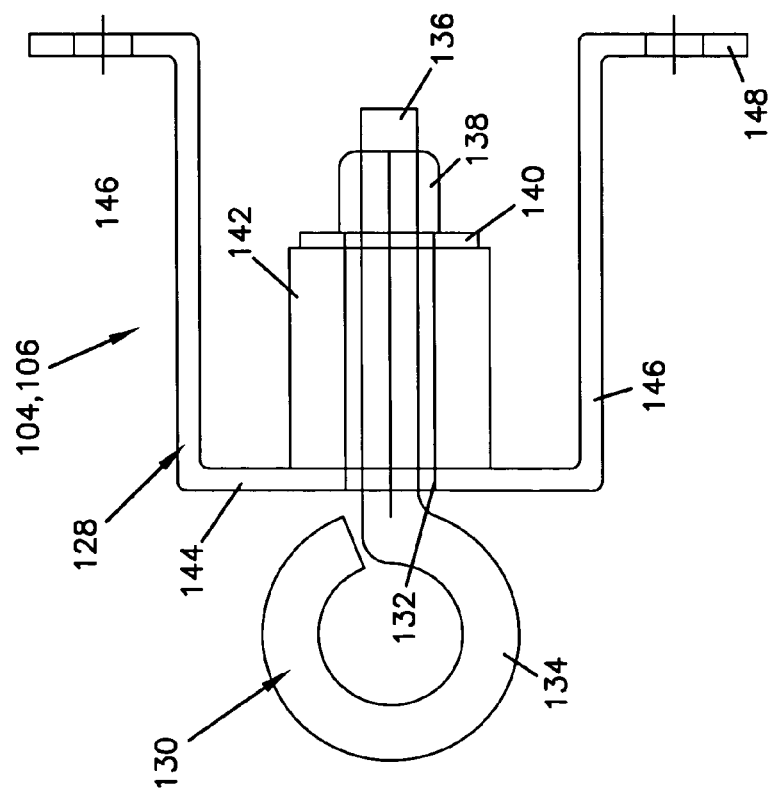
FIG. 2 is a side view of an anchor for securing the ends of the cable in the system of FIG. 1.

Referring now to FIGS. 2 and 3, anchors 104 and 106 may be identically configured to include a housing 128 with an eyebolt 130 mounted through an opening 132. Eyebolt 130 includes a threaded shank 136 extending through opening 132 and also through an elastomeric cylinder 142. Cylinder 142 may be made of rubber or other suitable material to provide some attenuation of shock loads transmitted through cable 102. Shank 136 may accept a washer 140 and a nut 138 to hold eyebolt 130 to anchor 104 and 106. Housing 140 includes an endface 144 through which opening 132 extends, a pair of opposing sides 146 ad a pair of mounting flanges 148. Flanges 148 include opening 150 for receiving fasteners such as screws to mount anchor 104 or 106 to end support 108 or 110, respectively.

Referring now to FIGS. 4 and 5, trolley 116 includes a frame 152 to which are mounted first wheel 154, second wheel 156 and third wheel 158. Wheels 154, 156 and 158 rotate about axles 160, 162 and 164, respectively. A leash attachment opening 166 is positioned adjacent a lower end 170 of frame 152. Wheels 154, 156 and 158 cooperate to define a cable path 168 through cable 102 may pass. As shown, wheel 154 rotates about axle 160 which is movably mounted to frame 152. Axle 160 is directly connected to a hub 172 which is mounted within an elongated vertically elongated opening 176 in frame 152. A spring 174 positioned over a post 178 within opening 176 biases hub 172 toward an upper end of opening 176 but allows hub 172 to be displaced away from cable path 168 toward lower end 170 of frame 152. Such downward displacement of hub 172 and wheel 154 may assist in the placement of cable 102 within cable path 168 and allows trolley 116 to pass across intermediate supports 112 without losing contact with cable 102.

Figure 6:
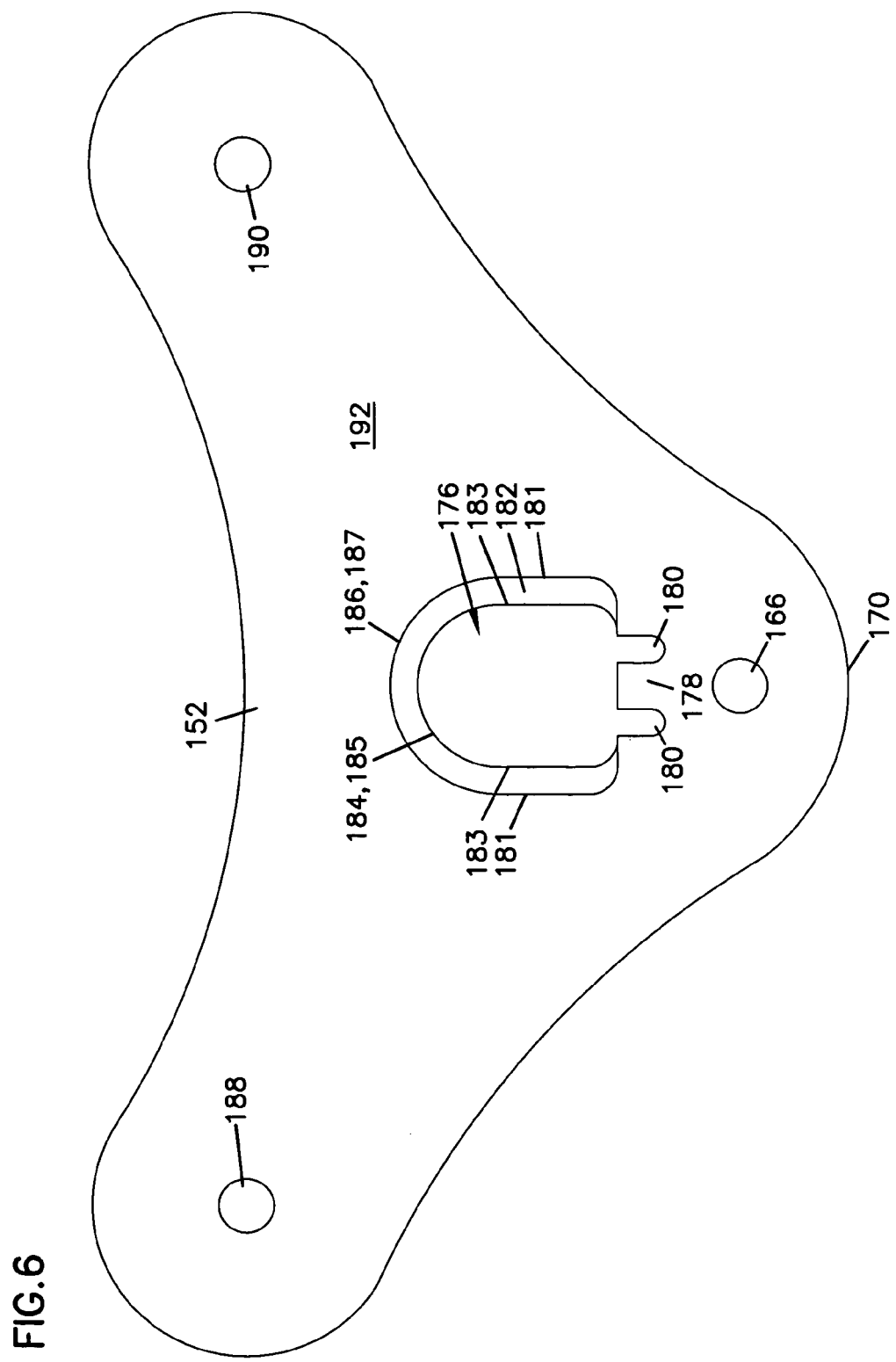
FIG. 6 is a front view of a frame for the trolley of FIG. 4.

Referring now to FIG. 6, post 178 of opening 176 in frame 152 if formed by a pair of lobes 180 extending downward. Opening 176 also defines two different spaces. A smaller space or opening 184 extends through frame 152 from a first face 192 to a second face 194. A portion of the limits of opening 184 is defined by an inward extending lip 182 within a larger space or recess 186. Space 186 is formed in both faces 192 and 194 but does not extend through frame 152. As shown, recesses 186 on either opposing side of frame 152 are similarly sized and shaped. It is anticipated that different sizes and shapes of openings 184 and recesses 186 may be used and that recesses 186 may not be identically or similarly shaped in both faces 192 and 194. Recesses 186 include an arched top 187 opposite post 178 and a pair of opposing sides 181. Opening 184 includes an arched top 185 opposite post 178 and a pair of opposing sides 183.

Fixed axles 162 and 164, holding wheels 154 and 156, respectively, may be mounted within axle openings 188 and 190, respectively, which extend through frame 152. Axles 162 and 164 are shown as threadably mounted within openings 188 and 190. Alternatively, axles 162 and 164 may be press fit within openings 188 and 190, or may extend through frame 152 to be secured with a nut or other fastener adjacent second face 194.

Referring now to FIGS. 7 to 9, hub 172 includes a first hub portion 202 and a second hub portion 204 with an axle opening 206 extending through both portions. Axle 160 to which first wheel 154 is mounted is positioned within opening 206 and engages both portions 202 and 204. In a bottom of hub 172 is a recess 200 for receiving spring 174. Recess 200 cooperates with post 178 to capture spring 174 between hub 172 and frame 152 within opening 176. Hub 172 defines two outer flanges 198 and an inner groove 196. Inner groove 196 includes an arched upper surface 208 shaped to generally match and fit within arched top 185 of opening 184. Inner groove 196 also includes a pair of opposing sides 210 sized to fit between opposing sides 183 of opening 184. Outer flanges 198 include an arched upper surface 212 shaped to generally match and fit within arched top 187 of recess 186 of frame 152. Outer flanges 198 also includes a pair of opposing sides 214 sized to fit between opposing sides 181 of recess 186. Along a bottom edge 216 of hub 172, both inner groove 196 and outer flanges 198 are generally even with each other adjacent recess 200.

Hub 172 is sized so that portion 202 may be placed within recess 186 of one of face 192 or 194 of frame 152, and 204 placed within recess 186 of the opposite face. With axle 160 inserted within opening 206, the two hub portions are joined together with flanges 198 engaging lip 182 to hold hub 172 within opening 184 and recesses 186. With spring 174 positioned about post 178 and within recess 200, as shown in FIG. 5, hub 172 is slidably urged so that arched upper surfaces 208 and 212 are adjacent arched tops 185 and 187 of opening 184 and recesses 186, respectively.

Referring now to FIGS. 10 and 11, wheel 154 includes an inner face 220, an outer face 222, with a circumferential groove 218 in an outer surface 219. Wheels 156 and 158 are similarly configured as wheel 154 and it should be understood that the description of wheel 154 may apply equally to wheels 156 and 158. The circumferential grooves 218 about each of the wheels cooperate to form cable path 168, as shown in FIG. 5. Groove 218 is sized to slidably receive cable 102 and also to permit passage of trolley 116 across intermediate cable supports 112. Wheel 154 also includes a central opening 228 with an interior wall 226 and a inwardly extending circumferential ledge 224 defining a smaller diameter than a diameter defined by wall 226.

FIGS. 12 and 13 show an inner retainer 230 with an axle opening 232 and an outer edge 234. Outer edge 234 is sized to fit closely within ledge 224 within opening 228 of wheel 154. FIGS. 14 and 14 show an outer retainer 236 with an axle opening 238 and an outer edge 240. Outer edge 240 is sized to fit closely within interior wall 226 of opening 228 of wheel 154. As shown in FIG. 5, inner retainer 230 and outer retainer 236 retain a bearing such as a bushing 242 within opening 228 of wheel 154 to allow wheel 154 to freely rotate about axle 160. Axle 160 extends though axle openings 232 and 238 and through bushing 242. Ledge 224 positions bushing 242 laterally within opening 228 and outer retainer 238 pressing on the opposite side of bushing 242 prevents wheel 154 from being removed from axle 160. An inner face 244 of inner retainer 230 is positioned adjacent face 192 of frame 152 and an outer face 246 of inner retainer 230 is positioned adjacent bushing 242. An outer face 248 of outer retainer 236 engages a head 161 of axle 160 and an inner face 250 of outer retainer 236 is positioned adjacent bushing 242 opposite inner face 246 of inner retainer 230.

Figure 16:
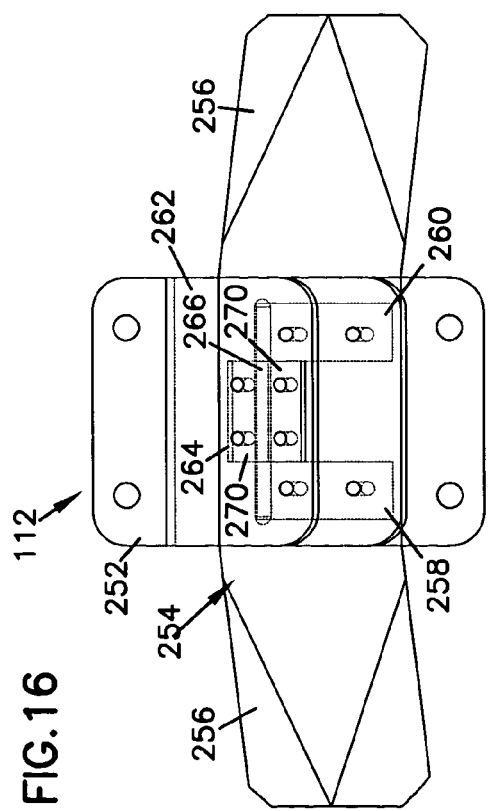
FIG. 16 is a front view of an intermediate cable support for use with the system of FIG. 1, with several features shown by hidden lines and fasteners removed for clarity.
Figure 17:
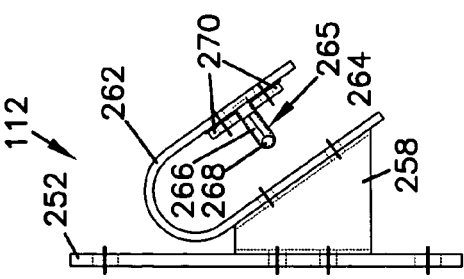
FIG. 17 is a side view of the intermediate cable support of FIG. 16, with the guide plate removed, with several features shown by hidden lines.

Referring now to FIGS. 16 and 17, intermediate cable support 112 includes a mounting plate 252 and a guide plate 254 with a pair of trolley guides 256 extending from either side. A pair of angled brackets 258 and 260 mount and a trolley tunnel 262 to mounting plate 252 and position tunnel 262 at an angle to mounting plate 252. Within tunnel 262 is a cable holder 265 with an outer bracket 264 and an inner guide 266 cooperating to form a cable path 268 through cable 102 may be directed. Guide plate 254 is mounted within tunnel 262 opposite angled brackets 258 and 260 (not shown in FIG. 17 for clarity).

Figure 18:
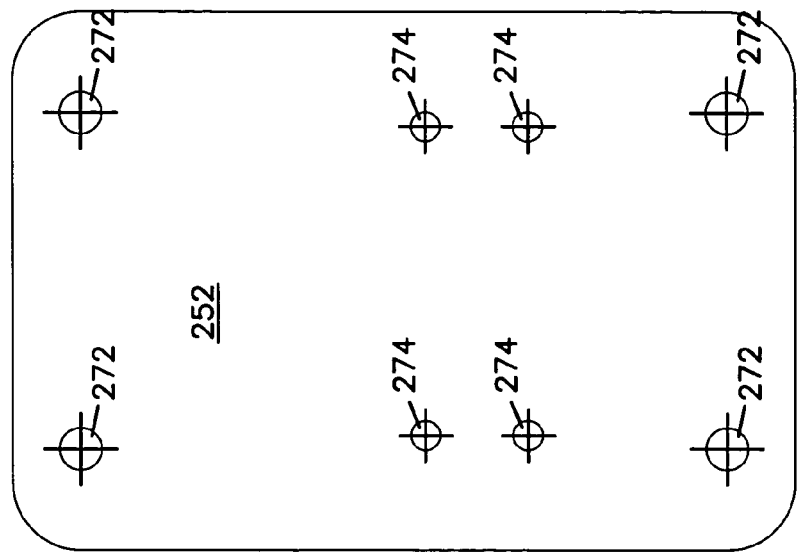
FIG. 18 is a front view of a mounting plate of the intermediate cable support of FIG. 16.

Referring now FIG. 18, mounting plate 252 includes a plurality of fastener openings 272 for receiving fasteners to attach mounting plate 252 to an intermediate support 114. As shown, a pair of openings 272 are included at each of a top and bottom edge of plate 252. Also included in mounting plate 252 are a plurality of openings 274 for mounting brackets 258 and 260 to plate 252.

Figure 19:
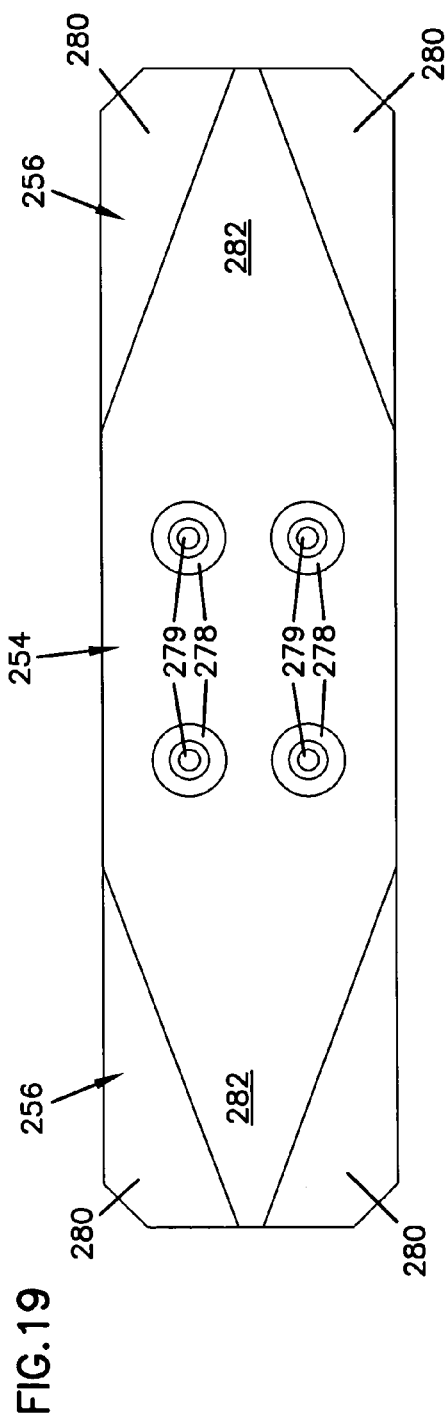
FIG. 19 is a front view of the guide plate of the intermediate cable support of FIG. 16.
Figure 20:
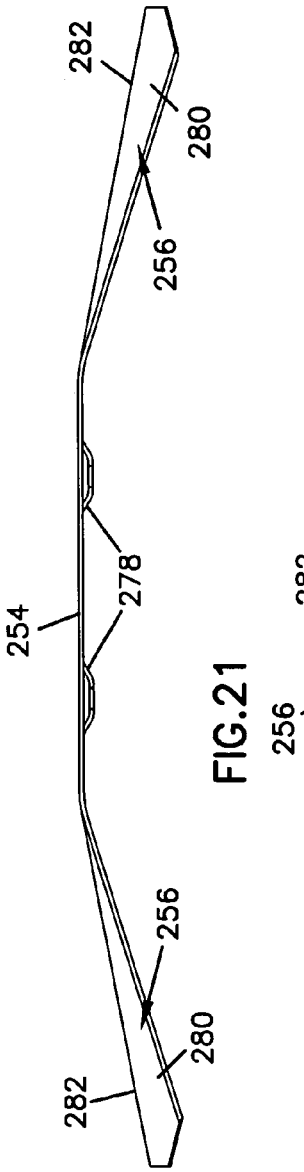
FIG. 20 is a top view of the guide plate of FIG. 19.
Figure 21:
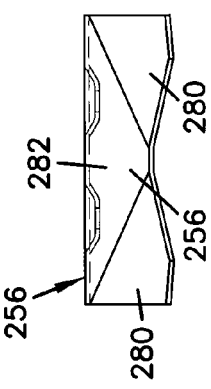
FIG. 21 is an end view of the guide plate of FIG. 19.
Figure 24:
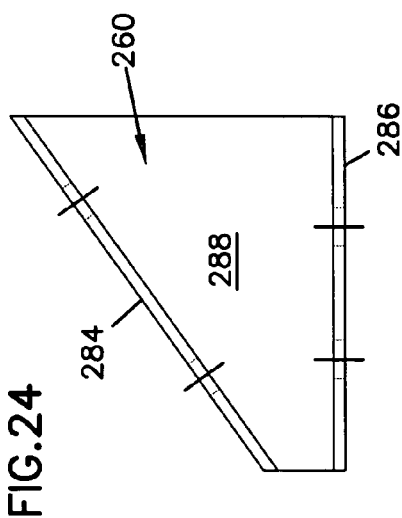
FIG. 24 is a side view of a second mounting bracket of the intermediate cable support of FIG. 16.

FIGS. 19 to 21 show guide plate 254 including the pair of guide wings 256 extending from either side. Between guide wings 256 are a plurality of openings 276 for receiving fasteners for mounting guide plate 254 to tunnel 262 opposite angled brackets 258 and 260. Each opening 276 may be positioned within a recessed portion or dimple 278 to provide an offset mounting for guide plate 254, offsetting guide plate 254 from an inner wall of tunnel 262 toward cable path 268. Alternatively, openings 276 may be positioned flush with the adjacent portions of guide plate 254, without any dimples. Wings 256 serve as guides to properly position and angle trolley 116 to pass across intermediate support 112, when assembled as shown in FIG. 1. Each of the guide wings 256 includes a central portion 282 angled back with respect to the central portion of guide plate 254 where openings 276 are located. Angled back further from central portion are additional angled portions or flaps 280, defining the outermost corners of guide plate 254. Alternatively, central portions 282 may be angled back flat without any additional angled portions or flaps.

Figure 26:
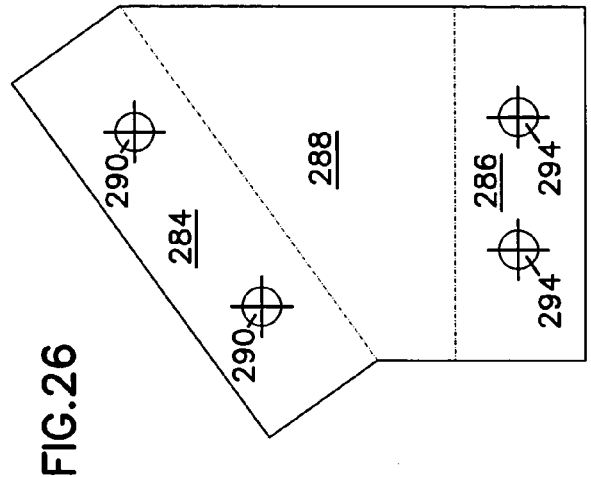
FIG. 26 is a view of material used to form either of the first and second mounting brackets, prior to be folded into the shape shown in FIGS. 22 and 23, or FIGS. 24 and 25.
Figure 23:
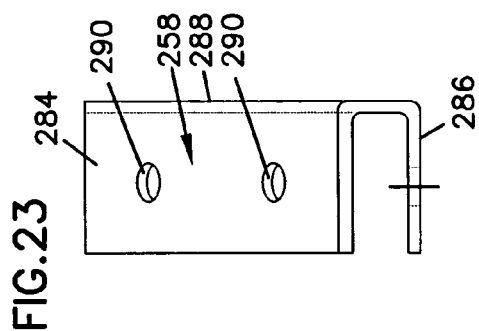
FIG. 23 is a top view of the first mounting bracket of FIG. 22.
Figure 25:
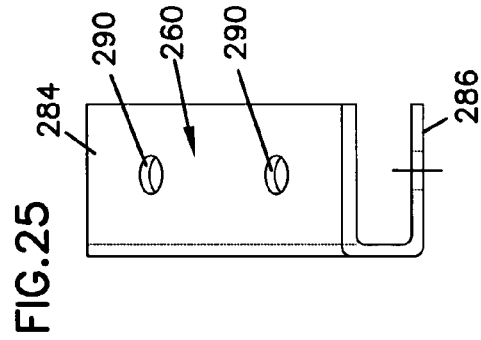
FIG. 25 is a top view of the second mounting bracket of FIG. 24.
Figure 22:
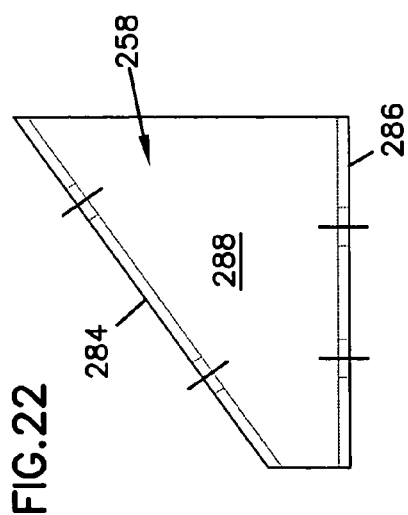
FIG. 22 is a side view of a first mounting bracket of the intermediate cable support of FIG. 16.

FIGS. 22 to 26 show angled brackets 258 and 260, each of which include an angled mounting flange 284 and a rear mounting flange 286, connected by a web 288. Both angled brackets 258 and 260 may be formed from a common shape of sheet material 292, as shown in FIG. 26. The difference between the two different brackets is the direction in which the two flanges are turned from sheet material 292, along a pair of fold lines 296. Each angled flange 284 includes a pair of mounting opening 290 for receiving fasteners to attach guide plate 254 (through openings 276), and tunnel 262 through openings 298 (see FIGS. 27 and 28), to brackets 258 and 260. Each rear flange 286 includes a pair of mounting openings 294 for receiving fasteners to mount angled brackets 258 and 260 to mounting plate 252, through openings 274.

Figure 28:
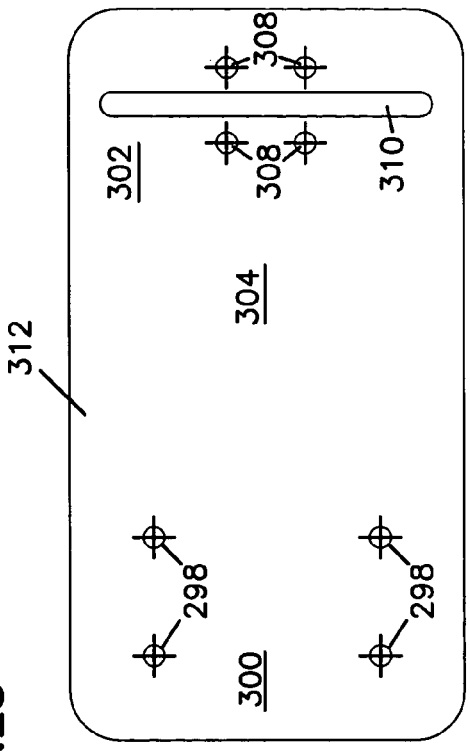
FIG. 28 is a view of material used to form the tunnel of FIG. 27, prior to folding into the shape shown in FIGS. 16, 17 and 27.
Figure 27:
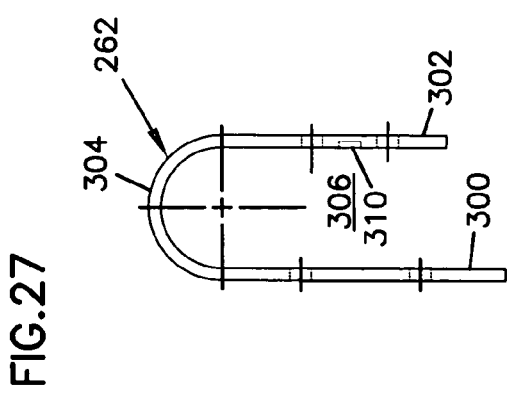
FIG. 27 is an end view of a cable tunnel of the intermediate cable support of FIG. 16.

FIGS. 27 and 28 show tunnel 262 and a shape of sheet material 312 from which tunnel 262 may be formed. In FIG. 27, tunnel 262 includes an inner wall 300, an outer wall 302, and an arched top 304 between the inner and outer walls, cooperating to define an open bottomed tunnel 306. In FIG. 28, a portion of shape 312 which will be inner wall 300 when formed into tunnel 262 includes a plurality of openings 298, for receiving fasteners extending through openings 290 of brackets 258 and 260. A portion of shape 312 which will become outer wall 302 when formed into tunnel 262 includes a plurality of openings 308, which receive fasteners extending through outer bracket 264, discussed further below. The same portion of shape 312 corresponding to outer wall 302 also includes a slot 310 for receiving inner guide 266. Slot 310, as shown, does not extend the full depth of outer wall 302, providing a recessed location for positioning inner guide 266.

Figure 31:
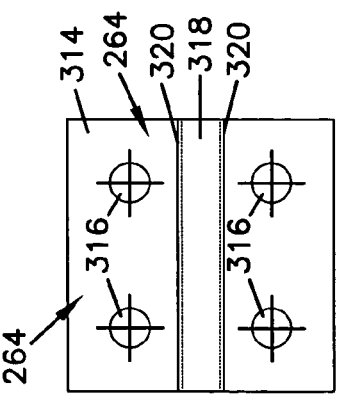
FIG. 31 is a top view of the outer bracket of FIG. 29.
Figure 30:
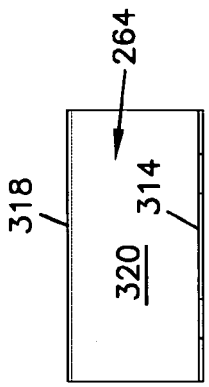
FIG. 30 is a side view of the outer bracket of FIG. 29.
Figure 29:
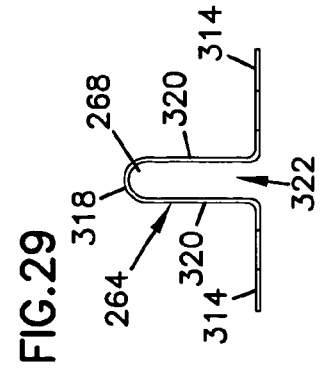
FIG. 29 is an end view of an outer bracket of a cable holder of the intermediate cable support of FIG. 16.

Referring now to FIGS. 29 to 31, outer bracket 264 of cable holder 265 includes a pair of mounting flanges 314 including fastener openings 316 for receiving fasteners extending through openings 308 of tunnel 262. Between flanges 314 is an open bottomed area 322 defined by a pair of side walls 320 with an arched top 318 closing off the upper portion of area 322. Area 322 is sized to receive inner guide 266, described below, between side walls 320 and to receive cable 102 adjacent arched top 318 which defines a portion of cable path 268.

Figure 32:
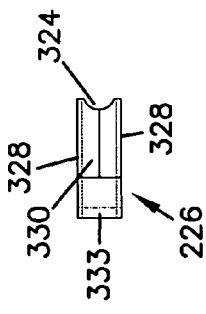
FIG. 32 is an end view of an inner guide of the cable holder of the intermediate cable support of FIG. 16.
Figure 33:
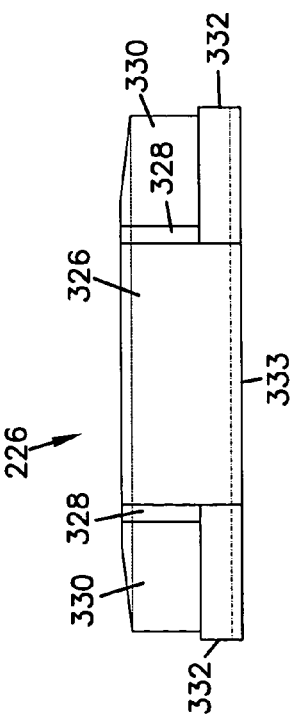
FIG. 33 is a side view of the inner guide of FIG. 32.
Figure 34:
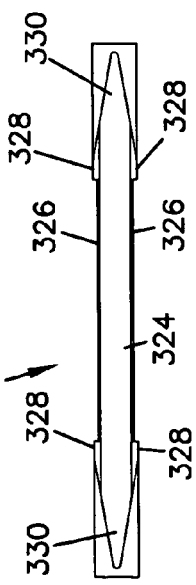
FIG. 34 is a top view of the inner guide of FIG. 32.

The remainder of cable path 268 is defined by an upper groove 324 of inner guide 266, shown in FIGS. 32 to 34. Inner guide 266 also includes a pair of opposing recesses 326 for receiving side walls 320 of outer bracket 264. Cable 102 would be positioned within groove 324 and bracket 264 placed atop cable 102 to hold cable 102 within cable path 268 of cable holder 265. On either side of recess 326 are side walls 328 of inner guide 266, which define a width approximately equal to the width of sidewalls 320 of outer bracket 264 positioned about recesses 326. In other words, recesses 326 are inset from side walls 328 by about the same thickness of material used to form outer bracket 264. Extending from side walls 328 to opposite ends 332 of inner guide 266 are a pair of tapered portions 330. A base 333 of inner guide 266 is sized to be positioned within slot 310 of tunnel 262.

As trolley 116 moves along cable 102 across intermediate support 112, guide plate 254 angles trolley 112 prior to trolley 112 entering tunnel 262. This gross alignment positions trolley 116 about cable 102 so that one of the tapered portions 330 of inner guide 266 will engage one of the wheel 156 or 158 and, if needed, more closely align cable path 168 so that cable holder 265 may pass smoothly between wheel 154, and wheels 156 and 158. Tapered portion 330 provides a smooth transition of one of the wheels 156 or 158 into this closer alignment to reduce resistance to the passage of cable holder 265 through cable path 168.

Figure 35:
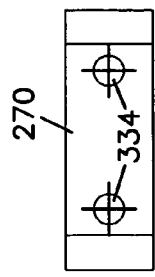
FIG. 35 is a top view of a nut plate for securing the cable guide to the intermediate cable support of FIG. 16.
Figure 36:
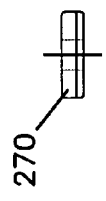
FIG. 36 is an end view of the nut plate of FIG. 35.
Figure 37:
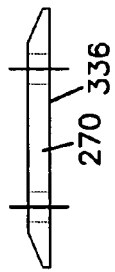
FIG. 37 is a side view of the nut plate of FIG. 35.

In FIGS. 35 to 37, nut plate 270 includes a pair of fastener openings 334 and an inner face 336 which engages one of the flanges 314 of outer bracket 264. Fasteners extending through openings 308 in tunnel 262 and openings 316 of outer bracket 264 also extend through openings 334 so that cable holder 265 may be assembled within tunnel 262, as shown in FIG. 17.

The above specification, examples and figures provide a complete description of the manufacture and use of the invention. Since many embodiments of the invention can be made without departing from the spirit and scope of the invention, the invention resides in the claims hereinafter appended.

What is claimed is:

1. A pet restraint system comprising:
   a cable extending between a first anchor and a second anchor, the cable suspended above the ground between the anchors;
   at least one intermediate support supporting the cable above the ground and positioned between the anchors;
   a wheeled trolley mounted to the cable and slidable along a length of the cable, the trolley having three wheels, a movable wheel contacting the cable and two of the wheels contacting the cable opposite the movable wheel, the trolley maintaining contact with the cable as the trolley passes across the intermediate support;
   a pet leash with a first end attached to the trolley and a second end adapted for being releasably connected to a pet harness;
   the intermediate support including a portion mounted about the cable, the movable wheel of the trolley slidably mounted to the trolley, sliding generally perpendicular to the cable and spring biased toward the opposing wheels, the movable wheel slidable from a first position toward the opposing wheels where the three wheels cooperate to hold the trolley to the cable and a second position away from the opposing wheels to permit the trolley to pass across the intermediate support.

2. The system of claim 1, wherein the intermediate support includes a mounting plate for mounting the intermediate support to an object between the first and second anchors, and a cable holder positioned about and holding the cable, the cable holder configured so that the wheels of the trolley pass over the cable holder as the trolley passes over the intermediate support.

3. The system of claim 2, wherein the intermediate support includes a tunnel within which the cable holder is positioned, the tunnel having a closed top and an open bottom, an inner wall and an outer wall, the cable holder mounted to an inner surface of the outer wall.

4. The system of claim 3, wherein the tunnel is mounted to the mounting plate by an offset bracket to position the tunnel and cable outwardly from the mounting plate and the object to which the mounting plate is attached.

5. The system of claim 4, wherein the tunnel is angled with respect to mounting plate with the top toward the mounting plate and the bottom away from the mounting plate.

6. The system of claim 3, wherein the mounting plate includes a pair of guides extending from opposing sides of the mounting plate to direct the trolley into the tunnel as the trolley moves along the cable toward the intermediate support.

7. The system of claim 1, wherein the movable wheel is mounted to a sliding hub assembly, and the hub assembly is slidably mounted within a hub opening in the trolley.

8. The system of claim 7, wherein the hub assembly includes a first flange larger than the hub opening in the trolley, an intermediate portion sized to fit within the hub opening and permit movement of the movable wheel between the first and second positions, and a second flange larger than the hub opening in the trolley, the opening including a post and the hub assembly including a cooperating opening to captively hold the spring biasing the movable wheel to the first position.

9. A trolley for a pet restraint system including a cable extending between first and second anchors and including an intermediate support positioned between the two anchors supporting the cable, the trolley comprising:
   a frame, a first wheel and a second wheel rotatably mounted to the frame by fixed axles, and a third wheel positioned intermediate the first and second wheels and rotatably mounted to the frame by a movable axle, each of the wheels including a circumferential outer groove sized to receive the cable;
   the wheels positioned to define a cable path with the first and second wheels on a first side of the cable path and the third wheel on an opposite side of the cable path;
   the movable axle movable in a direction generally perpendicular to the cable path between a first position and a second position, wherein with the movable axle in the first position, the cable path is sized to retain the cable with the grooves of the wheels, and with the movable axle in the second position, the cable path is sized to permit the intermediate support to pass through the cable path without removing the cable from the cable path;
   the movable axle biased to the first position; and,
   an attachment point for attaching a pet leash.

10. The trolley of claim 9, wherein when the trolley is positioned with the cable extending within the cable path, the first and second wheels are above the cable and the third wheel and the attachment point are positioned below the cable.

11. The trolley of claim 9, wherein the movable axle is mounted to a sliding hub assembly, and the hub assembly is slidably mounted within a hub opening in the frame.

12. The trolley of claim 11, wherein the hub assembly includes a first flange larger than the hub opening in the trolley, an intermediate portion sized to fit within the hub opening and permit movement of the movable wheel between the first and second positions, and a second flange larger than the hub opening in the frame, the hub opening including a post and the hub assembly including a cooperating opening to captively hold the spring biasing the third wheel to the first position.

* * * * *